(12) United States Patent
Zhou et al.

(10) Patent No.: US 11,706,470 B1
(45) Date of Patent: Jul. 18, 2023

(54) ENHANCED ON-TARGET RATE OPTIMIZATION FOR VIDEO USING MACHINE LEARNING

(71) Applicant: Amazon Technologies, Inc., Seattle, WA (US)

(72) Inventors: Xinyu Zhou, Bellevue, WA (US); Qie Hu Huang, Sunnyvale, CA (US); Shuang Li, Los Angeles, CA (US); Ying Zhang, Bellevue, WA (US); Yongzhen Lu, Mountlake Terrace, WA (US); Vamshi Krishna Surabhi, Redmond, WA (US); Vykunth Ashok, Bellevue, WA (US); Robert James Victor, Brookville, PA (US); Kirtan Modi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/584,009

(22) Filed: Jan. 25, 2022

(51) Int. Cl.
*H04N 21/262* (2011.01)
*H04N 21/25* (2011.01)
*H04N 21/81* (2011.01)
*H04N 21/258* (2011.01)

(52) U.S. Cl.
CPC ..... *H04N 21/252* (2013.01); *H04N 21/25883* (2013.01); *H04N 21/26241* (2013.01); *H04N 21/812* (2013.01)

(58) Field of Classification Search
CPC ................................................. H04N 21/26241
See application file for complete search history.

(56) References Cited

U.S. PATENT DOCUMENTS

2017/0208370 A1\* 7/2017 Ray ..................... H04N 21/266
2021/0281907 A1\* 9/2021 Hoffert ............. H04N 21/2668

\* cited by examiner

*Primary Examiner* — Michael H Hong
(74) *Attorney, Agent, or Firm* — Eversheds Sutherland (US) LLP

(57) ABSTRACT

Devices, systems, and methods are provided for on-target rate optimization for video. A method may include receiving streaming video advertisement impression data; receiving user activity data indicative of day-parts when viewers watch content; generating, based on the streaming video advertisement impression data and the survey data, using a machine learning model, a demographic probability vector, wherein each entry of the demographic probability vector is indicative of a probability that a viewer is in a respective age range of the non-overlapping demographic groups; generating, using the machine learning model, an audience recognition model with the demographic probability vector; generating a synthetic audience model predicting future advertisement viewing behavior; generating an assignment of an advertisement bid to a respective demographic group of the non-overlapping demographic groups; and generating, based on the assignment, a list of target demographic groups of the non-overlapping demographic groups for a bid request associated with the advertisement bid.

20 Claims, 9 Drawing Sheets

US 11,706,470 B1

ENHANCED ON-TARGET RATE OPTIMIZATION FOR VIDEO USING MACHINE LEARNING

BACKGROUND

In video advertising, some advertisement delivery systems rely on impressions to determine how often an advertisement is presented. However, when homes have multiple viewers, advertisement targeting is complicated in part by the inability of some advertisement delivery systems to determine whether advertisements were presented to particular viewers. For example, some advertisement delivery systems may be unable to discern whether an advertisement was presented to a first viewer or a second user when both users share an account.

Figure 1:
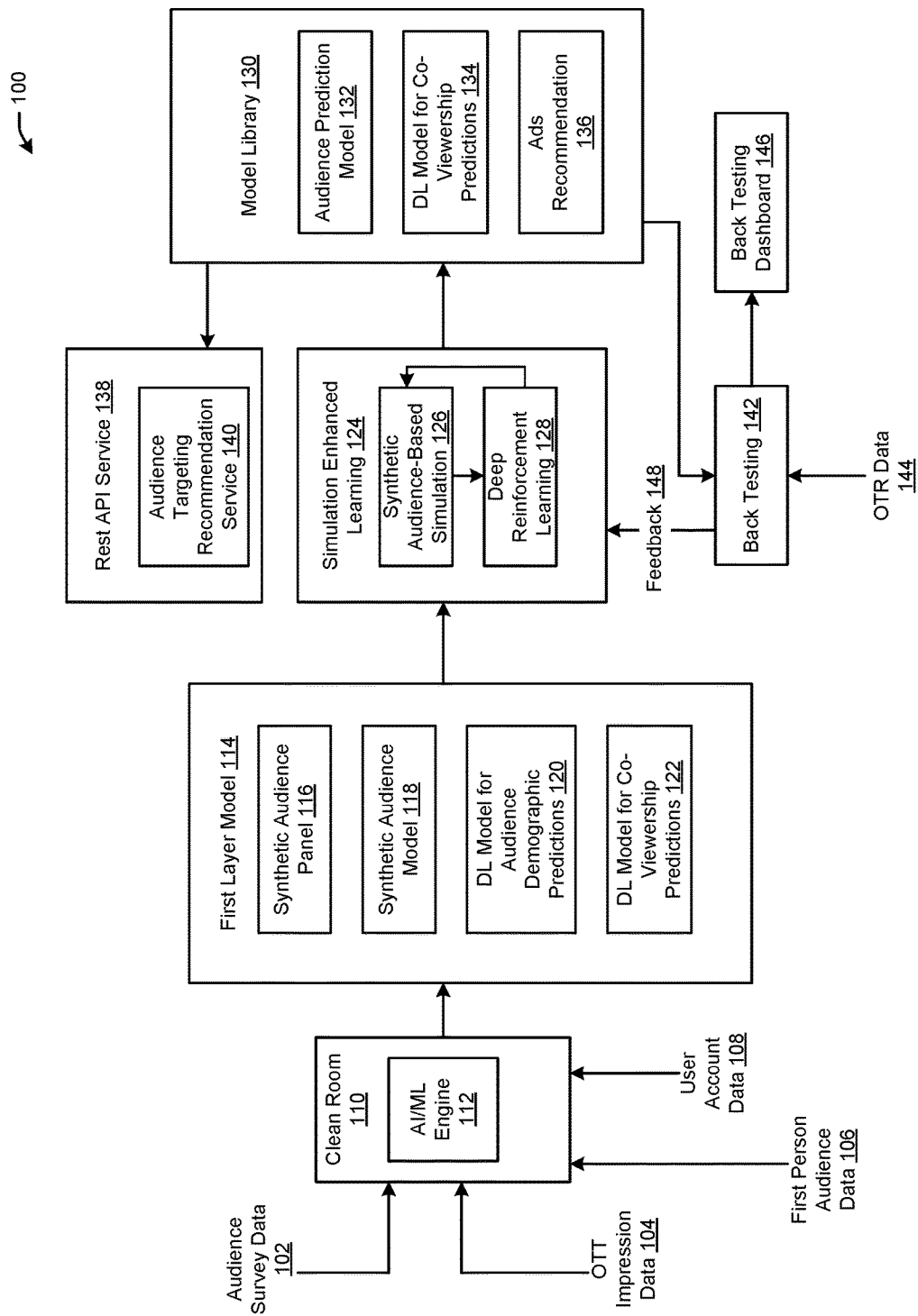
FIG. 1 shows an example system for optimizing the on-target rate of video advertisements, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for optimizing the on-target rate of video advertisements.

Over-the-top (OTT) advertising refers to advertising delivered directly to viewers, in contrast with pre-planned advertising based on broadcast schedules dependent on content providers. For example, OTT advertising may be delivered over the Internet using streaming video applications and devices. OTT media services (e.g., streaming media applications) may deliver content using OTT techniques.

An on-target rate (OTR) in advertising may refer to a performance metric measuring the percentage of total impressions delivered for a campaign, which are viewed by defined target audience. For example, an OTR of 75% for a particular demographic (e.g., age and gender) may mean that 75% of the impressions served for a campaign were served to an audience of the particular demographic. Higher OTR generally leads to greater on-target reach and fewer "wasted" impressions.

For audience targeting, some existing advertisement systems are based on the demographics of an account owner (e.g., an OTT account owner). For example, for user accounts of an OTT streaming system, some existing advertisement systems rely on known demographic information of the account holder. However, the actual viewer of a served OTT advertisement may not be the account owner, but rather may be another member of the home using the same account, leading to incorrect audience targeting and lower OTR. In addition, available demographic information for an account holder may be incorrect, and audiences may include co-viewers (e.g., multiple viewers of a household watching the same presented advertisement).

In some situations, a system may not be able to determine whether a viewer has viewed an advertisement. For example, when the viewer uses a third-party website without a cookie, the system may see that the viewer went to/from the site, but not necessarily whether the viewer saw an advertisement there. More specifically, when a user watches video using a third-party web browser (e.g., and the system does not have a cookie for the browser) or other third-party platform, the system may be aware of a number of users who watch the type/genre of the video and what other content they view, and what advertisements were served for that other content. Therefore, the system may presume a likelihood that the user was presented with the advertisement when using the third-party browser. In addition, because a household may have multiple viewers, systems may not be able to identify the actual viewer or viewers to whom content was presented. For example, knowing that content was presented via a user account may not be dispositive in determining which user of the user account, when there are multiple users, viewed the content.

There is therefore a need for optimizing the on-target rate of video advertisements.

In one or more embodiments, an advertisement system may use an enhanced machine learning framework to improve OTT advertisement delivery in real-time, resulting in improved OTR for OTT advertisements. The enhanced machine learning framework may include an audience recognition model to estimate the demographics (e.g., gender and age) of an actual audience based on contextual and other features. The enhanced machine learning framework may include a synthetic audience model to forecast the amount of future OTT traffic for different gender groups. The enhanced machine learning framework may include a reinforcement learning (RL)-based campaign prioritization model to optimize audience targeting based on estimated demographics of an audience, forecasted future OTT traffic, and current active campaigns. The enhanced machine learning framework may be deployed as a real-time audience targeting recognition service, which may output a ranked list of optimal target audience segments for campaigns based on a bid request. A production audience targeting system may consume the ranked list to determine which campaign wins a bid.

In one or more embodiments, with regard to the real-time audience recognition model and an active audience panel, the advertisement system may identify accurately the actual viewer of a served OTT advertisement at the time of the advertisement's impression. To overcome the challenge of obtaining the ground truth about a viewer, the system may use an active audience panel of active single adult households and multi-active user households. In addition, the system may use data from the panel and external syndicated survey data (e.g., third-party audience survey data) to train the audience recognition model to estimate the actual viewer of the served OTT advertisement based on contextual features and household features. For example, the system may determine, using OTT impression data, that content of a particular genre was presented using an OTT device during a particular day-part. User activity data also may indicate when users of other applications or systems (e.g., not the OTT streaming system) may view content, using a particular device or application, and the genre of content presented. The audience recognition model may be an ensemble model that combines estimates from multiple individual models in the ensemble to generate an estimate of the viewer.

In one or more embodiments, with regard to the synthetic audience model, in addition to the real audience data and information related to an audience group, the synthetic audience model may use missing observations generated based on probabilistic distribution. For example, the advertising system may fit a viewership distribution within a household composition (e.g., number of household members and individual demographic information) using actual advertisement impression data. The active audience panel and additional audience survey data (e.g., of OTT users) may be used to generate the probabilistic distribution of the actual viewers in the household, considering both multi-member households and co-viewership (e.g., multiple household viewers both watching a served advertisement). The synthetic audience generated from the probabilistic distributions (e.g., percentages that a viewer is in respective demographic groups) may replicate the actual household composition, viewing behavior, household member demographics, and the real-time viewers. The synthetic audience model may forecast based on day-parts (e.g., hourly), enabling the implementation of an audience pool to report the real-time number of audiences within respective demographic groups.

In one or more embodiments, the advertisement system also may improve overall OTR by optimizing control policies with which to determine the audience demographic group based on prediction accuracy, inventory supply, and advertisement demand. The control policies may be optimized using the RL process of a simulation model of the system. The simulation model may include an audience recognition model, an RL model, and a forecast audience pool. The previously trained audience recognition model may be input into the simulation model to enable the control policies to be optimized using the RL model to improve the overall OTR. For any bid request in a simulated time window, the audience recognition model may estimate the respective probabilities of the audience's demographic (e.g., a percentage likelihood of being in a first demographic group, a percentage likelihood of being in a second demographic group, and so on for various possible demographic groups). The RL model may assign a bid to a demographic segment (e.g., group) by accounting for the audience demographic probability, expected future bid requests from different demographic groups, and all active campaign impressions to be delivered.

In one or more embodiments, to capture an OTT audience's viewing behavior and predict the actual viewer's demographic, the advertisement system may use a privacy-compliant clean room as a data processing environment to ensure user privacy (e.g., compliant with relevant laws and with user consent).

In one or more embodiments, the advertisement system may be an OTT system with access to OTT impressions based on content presented to OTT users affiliated with the system. However, users may be presented content using other mediums, such as television, web browsers, and the like, for which the system may not have impression data. The system may receive user activity data, such as television survey data, web browser data, and the like, indicating content that users view at particular times.

In one or more embodiments, the advertisement delivery system may manage advertisement targeting without knowing deterministic identities (e.g., which member of a household is the viewer). Instead, the advertisement system may generate and use conditional probabilities indicative of the likelihood that a user has seen an advertisement. For example, the advertisement system may have access to user account data (e.g., for OTT streaming media users), and the user account data may provide user demographic information. The advertisement system also may have access to OTT impression data and bid requests, including contextual and/or household features. For example, the advertisement system may determine, using OTT impression data, that content of a particular genre was presented using an OTT device during a particular day-part. The user activity data also may indicate when users of other applications or systems (e.g., not the OTT streaming system) may view content, using a particular device or application, and the genre of content presented.

In one or more embodiments, inputs to the audience recognition model of the advertisement system may include OTT impression log data (including advertisement metadata and bid request content), consumer survey data (e.g., provided with user consent), user data from a video platform (with user consent), and first-person audience behavior segmentation data. The advertisement system may assume (1) that in multi active user (MAU) households, each active user may use their own account to view OTT; (2) an account user's provided demographic information is accurate; and (3) viewing behavior of viewers and preferences on OTT and television are similar. Based on the inputs and assumptions, the advertisement system may generate as an output a probability distribution of a viewer's demographic, along with performance metrics such as precision/recall of a predicted viewer demographic, and an offline test dataset.

In one or more embodiments, the audience recognition model of the advertisement delivery system may be a classification model that predicts demographics (e.g., age, gender, etc.) groups of a video audience in a bid request to a vector of probabilities. The advertisement system may define D non-overlapping demographic groups whose union is equal to a target demographic segment. The advertisement delivery system may use $b \in R^D$ to represent viewer ground truth demographic groups, and may use $\hat{b} \in R^D$ to represent viewer demographics estimated by the audience recognition model. Both $\hat{b}$ and $b$ may represent probability vectors (e.g., $1^T b = 1^T \hat{b} = 1$). For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by $b=[0, 1, 0, 1]$, and the audience recognition model may predict a viewer's demographic probability as $\hat{b}=[0.05, 0.45, 0.2, 0.3]$.

In one or more embodiments, the audience recognition model may represent an ensemble of multiple models, for example, one trained on first-person active OTT data, and another trained on third-person data (e.g., third-party provided user survey data). The audience recognition model may let $\hat{b}_i$ be an estimated demographic probability from the i-th model in the model ensemble. $\hat{b}_i$ probabilities may be combined in an additive or multiplicative manner to generate a final estimate $\hat{b}$. For example, using two models in the ensemble, an additive approach may be represented by Equation (1): $\hat{b} = \alpha \hat{b}_1 + (1-\alpha)$, where $0 \le \alpha \le 1$, and a multiplicative approach may be represented by Equation (2): $\hat{b} = \text{softmax}(\hat{b}_1 \odot \hat{b}_2)$, where $\odot$ represents element-wise multiplication.

In one or more embodiments, the audience recognition model may be trained using OTT audience panel data to provide an approximate source of truth for OTT viewer demographics. The audience panel may include active single adult households and MAU households. An active user may be a user who has at least N OTT impressions during a time window. A single adult household may have only one adult according to user data, and the model may assume that the true viewer is the account owner. An MAU household may have at least two adults according to user data, and at least two distinct active users. The model may assume that each active user uses their own user account to watch OTT. Any impression in this dataset may be labeled with exactly one demographic group, so the ground truth demographic representation for the above-described scenario may be $b=[0, 0, 0, 1]$. The model may use a combination of contextual and household features. Contextual features may include content genre, content rating, device type, hour of bid request, day-part (e.g., time segments of a day), weekend/weekday, month, geographic location, and the like. Household features may include the number of adults in the household, presence and age of children, household income, and the like. For offline model training and testing, contextual features may be available in OTT impression logs, and household features may be available. The features may be included in the bid request, but must not include age and gender of individual viewers, as those are target labels for the model to predict. In particular, user account-level data may include demographic data for the user to whom the user account is registered, but because the user account may be shared by multiple users (e.g., a multi-user household), the age and gender data may not be available for the specific individual users of the user account.

In one or more embodiments, the audience recognition model may be trained using syndicated survey data. The survey questions may cover television viewing behaviors, but not OTT viewing behavior. In this manner, the model may predict the true demographics of an OTT viewer. The model may assume that an individual's viewing behavior and preferences are similar for OTT and television viewing (e.g., if a viewer watches action movies on television, the viewer watches action movies on OTT). The survey data may not include impression-level data. The system may extract labeled data for training the model. For example, the survey data may indicate whether a person watches television during particular day-parts during the week or weekend, and the genres of programming that the person watches. The system may sum the values (e.g., with weighting) for any combination of [demographic group (age, gender), time period (day-part, weekday/weekend), program genre]. The system may normalize along the demographic group axis, providing labeled data with two features [time period, program genre], and the labels may represent probabilities of different demographic groups like $b=[0.5, 0.1, 0.2, 0.2]$. For offline model training and testing, the features may be available from the survey data, and may be available in a bid request.

In one or more embodiments, the audience recognition model may be validated in multiple ways when offline: (1) as a standalone audience recognition model, (2) as a component in an integrated in-flight advertisement delivery simulation system. For the standalone technique, active OTT panel data may be collected by the system for a time period, and randomly split into a training dataset and a held-out test dataset. Precision and recall metrics on the held-out test dataset may be used to measure the performance of the model and to compare the performance to a production system. By assumption, the active OTT panel dataset may include OTT impressions where the actual viewer is the registered user, implying that the production system would achieve perfect targeting on the active OTT panel dataset. Therefore, the system may not directly compare the model's prediction accuracy on the entire active OTT panel test dataset against that of the production system. Instead, the system may use the model to predict the most likely demographic group for each bid request in the test dataset, then compare the on-target rate (OTR) from the model with the default production system for any target demographic segment. The OTR may be a measurement of whether a respondent in a dataset is in a target demographic group.

In one or more embodiments, the system may include a synthetic audience model and synthetic panel. The synthetic audience model may learn from real audience data (e.g., of prior audiences), and may record information for the audience group and their behaviors across channels. The synthetic audience model may represent audience growth, demographics, and audience viewership with day-parts in a time-varying manner. The generation of the synthetic audience may replicate the original impression data, which may be deleted periodically (e.g., due to privacy policy). The synthetic audience model may include a hourly audience growth model, viewership distribution over different household composition groups, multi-user household viewership distribution, and co-viewership distribution.

In one or more embodiments, to forecast the hourly number of viewers within respective demographic groups, the hourly audience growth model may generate independent base forecasts for any video programs, and may use a reconciliation approach to combine the independent forecasts to obtain an estimator for the value P such that $\widetilde{c_{o,h}} = SP\widehat{c_{o,h}}$ based on the trace of the covariance matrix of the forecast errors. The optimal reconciled forecasts may be generated by the equation: $\widetilde{c_{o,h}} = S(S'W_h^{-1}S)^{-1}\widehat{c_{o,h}}$, where $W_h$ is the covariance matrix of the corresponding base forecast errors, and S is the summing matrix. The hourly audience growth model may use an optimal combination using ordinary least squares, an optimal combination using structurally weighted least squares (e.g., scaling the base forecasts using the variance of the residuals—weighted least squares), or a bottom-up method.

In one or more embodiments, the system may distribute original impression data into household composition groups and determine the viewership behavior of each group. H may be the set of all households in the original impression data, and $C_H$ may be the number of households in H. To clarify the usage of household composition, the system may divide OTT users (e.g., users of an OTT media service) into N disjoint demographic groups G, where $g_i \in G$ represents a demographic group (e.g., female: aged 18-34, etc.). The system may define household composition as a N-length vector m=[$m_1$, ..., $m_N$], where $m_i \in R$ represents the number of household members belonging to a demographic group $g_i$. There are a finite number of unique household compositions, so it may be beneficial to categorize H household composition groups M, where M is the set of all household composition groups, and each $M \in M$ represents a unique household composition group. Day-parts may be represented by D, where $D \in D$ is a specific day-part period. For each M, the system may divide into multiple subgroups, where each subgroup may represent an OTT viewership behavior during a specific day-part. The system may, for simplicity, consider an hourly average watching time during a day-part on OTT as the viewership behavior, represented by $T^D$. The system may characterize households in any subgroup as $H_{M,T^D}$. For example, if $g_i$=F18–34, M=[1, 0, ..., 0], D=primetime day-part, then $H_{M,T^D}$ represents the households with a single household member who is female, aged 18-34 whose hourly average OTT viewing time is T during prime time. The $H_{M,T^D}$ values may be disjoint, and H=$\cup H_{M,T^D}$. $C_{m,T^D}$ may represent the number of households in $H_{M,T^D}$.

In one or more embodiments, there may be a difference between OTR and segment-level validation because (1) a different adult in a respondent's household and in the target demographic group may be exposed instead of the actual respondent, lowering OTR, and (2) other adults in the respondent's household and in the target demographic group may have been co-viewing with the respondent. To account for these scenarios, the system may calibrate viewership distribution. Segment-level validation may be determined by dividing a number of OTT system users by the number of matched survey respondents in each demographic group.

In one or more embodiments, to calibrate viewership distribution for multi-user households, using OTT panel data, the system may generate a multiuser household viewership distribution. Using H as the set of all household compositions in the MAU households in the panel, and $C_H$ as the households in the MAU whose composition is H, for any $H \in H$, the system may use h=[$h_1$, ..., $h_N$] to represent each user in the household, and {$g_i$, ..., $g_n$} to represent the corresponding demographic group. Given a specific day-part, the system may determine a probability of viewing during the day-part as {$P_1$, ..., $P_n$}. An input to the algorithm may include demographic groups G, day-part categories D, and OTT panel data. The output may be a household viewership distribution P using the algorithm:

For each $H \in H$,
Determine the number of households in $C_H$;
For each $$h_i \in H, P_i = \frac{\text{number of impressions exposed to } h_i}{\text{number of impressions exposed to } H};$$

P=P$\cup${$g_1$, ..., $g_n$, $P_1$, ..., $P_n$}.

In one or more embodiments, to calibrate viewership distribution for co-viewership distribution, the system may map multiple levels of survey answers (e.g., strongly agree, somewhat agree, somewhat disagree, strongly disagree) to probabilities {$P_1$, $P_2$, $P_3$, $P_4$}. The number of adults in the labeled third-party survey data and the number of adults in labeled OTT user panel (e.g., survey) data as demographic group g may be represented as $M^g$, $A^g$ respectively. $H_i$ may represent the household of respondent i and $H_i^g$ may represent the number of demographic group g adults in $H_i$ as $H_i^g$. Matching with $OTR_g$, the system may estimate {$P_1$, $P_2$, $P_3$, $P_4$} using $$\frac{\Sigma_i 1_{g \in H_i \Sigma_j P_j H_i^g + M^g}}{A^g} = OTR_g. \quad \text{Equation (3)}$$

In one or more embodiments, the advertisement system may include an in-flight advertisement delivery simulation to enable offline training and evaluation of the audience targeting against a baseline (e.g., a proxy to a production system). The baseline may include an advertisement request event simulator that can use either the synthetic audience model or historical OTT impressions to generate a series of bid requests. The baseline may include an advertisement pool that records the active campaigns and campaign information, such as targeting demographic segments, total budget, remaining budget, and campaign start and end dates. The baseline may include an audience targeting module that, for any bid request, uses OTT user account owner demographics to assign the bid request to an audience segment, which may be used to filter out non-qualifying campaigns, while remaining qualifying campaigns may be ranked so that the highest ranking campaign wins the bid and is presented to the audience. The baseline also may include an advertisement watching event observer module to measure the OTRs of any campaigns. The baseline may be calibrated to approximate the production system by reducing the difference between the measured OTR from the advertisement watching event observer and the true OTR for any demographic segment from the production system.

In one or more embodiments, the audience targeting module may include an audience recognition model, a reinforcement learning (RL) model, and a forecast audience pool. For any bid request, the audience recognition model may estimate the probabilities of an audience's demographic. The RL model may assign the bid to a demographic segment by accounting for the audience demographic probability estimate generated by the audience recognition model, expected future bid requests from different demographic segments as generated by the forecast audience pool, and the total remaining budgets, total budgets, and target demographic segments of the active campaigns. Including expected future bid requests in the audience targeting module may allow the in-flight delivery system to achieve a better OTR. For example, when there is a large number of impressions for the demographic group males: aged 40-50 that are to be delivered during a future time period, and based on the latest advertisement pool information only a small number of bid requests from the demographic group are expected during the future time period, and when a bid request for viewers from both the demographic group and for the demographic group females: aged 40-50, the assignment of the bid request may be to the demographic group males: aged 40-50 segment.

In one or more embodiments, for an i-th bid request, $b_i \in R^D$ may denote the viewers' ground truth demographic groups. For example, when a group of three people (e.g., two boys and one adult female) are watching OTT video and trigger a bid request, the demographic representation of the bid request may be a four-dimensional vector $b_i=[2, 0, 0, 1]$. However, the ground truth demographic representation may not be known in a real-time production system, but rather may be known in the training data.

In one or more embodiments, it may be assumed that any campaign may target one demographic segment. To assign a segment to a bid request, the system may group campaigns with the same targeting segment into a single campaign, and may aggregate the budget and remaining budget of the grouped campaigns. Accordingly, the system may define that the j-th campaign includes the following information: $g_j \in R^D$ (the targeting segment vector), $m_j \in N$ (budget), $r_{i,j} \in N$ (remaining budget at the i-th bid request). The budget may be measured as the number of impressions to be delivered, and may be a negative value (e.g., representing over-delivery). The system may denote $$G = \left[ \frac{g_1^T}{|g_1|}; \frac{g_2^T}{|g_2|}; \ldots ; \frac{g_s^T}{|g_s|} \right] \in R^{S \times D}$$

as the campaign targeting demographic matrix, and may use the notation $r_i=[r_{i,1}, r_{i,2}, \ldots, r_{i,s}] \in R^S$ and $m=[m_1, m_2, \ldots, m_S] \in R^S$.

In one or more embodiments, the system may assign the $j_i$-th campaign to the i-th bid request. The i-th impression may be considered on-target if $\langle b_i, g_{j_i} \rangle > 0$ and $r_{i,j_i} > 0$. Overall, the $$OTR = \frac{\Sigma_{i=1}^{N} 1[\langle b_i, g_{j_i} \rangle > 0] \cdot [r_{i,j_i} > 0]}{N},$$

where $1[\cdot]$ is the indicator function, and N is the number of bid requests.

In one or more embodiments, the RL model may include a supply-side environment (e.g., bid requests) and a demand-side environment (e.g., campaigns). The RL environment may include the audience modeling module to provide the audience demographic estimation for a given bid request. A state may refer to the concatenation of three vectors: the matching vector of the estimated demographic representation of the bid request with the campaign demographics, $G\hat{b}_i$, the element-wise product of $G\hat{b}_i$ and $1[r_i>0]$, where $1[r_i>0]$ is a binary vector indicating whether the remaining campaign budget is positive for any respected campaign (e.g., an aggregated campaign for a respective segment), and the normalized campaign remaining budget (e.g., an aggregated campaign for a respective segment)

$$\frac{r_i}{\max_j(r_{i,j})}.$$

Therefore, the dimension of the state may be 3×D (e.g., three times the dimension of the D non-overlapping demographic groups). For an i-th bid request with a $j_i$-th campaign assigned, the RL model may assign an OTR reward of +1 when $\langle b_i, g_{j_i} \rangle > 0$ and $r_{i,j_i} > 0$, otherwise the reward may be zero. The action taken by the RL model may be the selection of a campaign. The RL model may use an agent and policy to decide which campaign is to be selected based on the state. Once a campaign is selected, the RL environment may assign a reward to the agent, which updates the policy according to the reward. The RL model may use a Q-learning algorithm or other deep reinforcement learning technique to learn the policy by learning a Q-value function that maps state and action to an expected reward. Given a state, the policy may be based on the maximal Q value over all actions. Because the state is continuous while the action is discrete, the RL model may formulate $Q(s,j)=[f(s)]_j$, where $f: R^{3D} \to R^S$ and s is the state vector, while j is the campaign index. A parametric model, such as a neural network, may model the policy f.

In one or more embodiments the RL model may use RL learning to learn the policy f and use the target policy g to generate next expected values. The RL model algorithm is shown below:

Data: Number of epoch T, bid request generator with their estimated viewer demographic vector $\{\hat{b}_i^{(t)}\}_{i=1, 2, \ldots, N}$ for $t=1, 2, \ldots, T$, campaign targeting demographic matrix G, campaign budget vector m, target update interval P, reward decay rate $\gamma$.

Result: A state value function that provides scores for assigning campaigns a given state.

Initialize the policy $f: R^{3D} \to R^S$ to be a parametric model;
Initialize the target g by f;
Initialize memory M;
for $t=1, 2, \ldots, T$ do
   Restart the bid request generator;
   Remaining budget $r_1^{(t)}=m$;
   for $i=1, 2, \ldots, T$ do
     Create the state $$u_i^{(t)} = \left[ G\hat{b}_i^{(t)}, G\hat{b}_i^{(t)} \odot 1[r_i^{(t)} > 0], \frac{r_i^{(t)}}{\max_j(r_{i,j}^{(t)})} \right];$$

Get action from policy $j_1^{(t)}=\mathrm{argmax}_j f(u_1^{(t)})_j$,
     Update remaining budget $$r_{i+1}^{(t)} = r_i^{(t)} - e_{j_i^{(t)}};$$

Get reward $$w_i^{(t)} = 1\left[ b_{i(t)}^T G_{j_i^{(t)},:} > 0 \right] \cdot 1\left[ r_{i,j_i^{(t)}}^{(t)} > 0 \right];$$

```
if i>1 then
    Append (u_{i-1}^{(t)}, j_{i-1}^{(t)}, u_i^{(t)}, w_{i-1}^{(t)}) to memory M;
    Q_learning (f, g, M, γ);
end
if mod (i, P)==0 then
    Sync the parameters of g by those of f;
end
end
end
return f.
```

In one or more embodiments, the Q_learning (f, g, M, γ) algorithm above may be defined by:
Data: current policy f, current target g, memory M, decay rate γ
Sample a set of state $u_0$, action j, next_state $u_1$, and reward w from M;
Calculate current state-action value $v_0 = f(u_0)_j$;
Calculate expected state action value $v = γv_1 + w$;
Update the parameters off according to gradient of $l(v, v_0)$ with respect to the parameters of f;

In one or more embodiments, the system may be deployed as a real-time audience targeting recommendation service that may respond to bid requests with known customer identifiers. The service may receive a bid request with a known customer identifier, and may pool the current campaign information, including target demographic segments, total budget, remaining budget, and campaign start and end dates. The service may use the trained audience targeting module to generate a ranked list of either optimal target demographic segments or optimal campaigns. The system may consume the ranked list to determine which campaign wins a given bid.

In one or more embodiments, when integrated as in-flight advertisement delivery system, the optimized OTR may be used to control advertisement pacing. In particular, an advertisement delivery system may use campaign pacing to control the speed of budget spending (e.g., impression delivery) during an advertising time period. In one or more embodiments, the pacing value of any advertisement may be used to adjust the priority of the advertisement. For example, when the advertisement has a higher/faster pacing value, the advertisement's priority may be increased in the recommendation list. When the advertisement has a lower/slower pacing value, the advertisement's priority may be decreased in the recommendation list. When the system predicts that an incoming audience may not meet the current campaign's pacing requirement, the system may generate a recommended pacing adjustment plan to optimize the pacing value to ensure a high OTR.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 shows an example system 100 for optimizing the on-target rate of video advertisements, in accordance with one or more example embodiments of the present disclosure.

Referring to FIG. 1, the system 100 may include audience survey data 102 104 (e.g., viewer survey data), OTT impression data 104, first-person audience data 106, and OTT user account data 108 (e.g., demographics of OTT user account holders) as inputs to a clean room 110 (e.g., to ensure user privacy). The clean room 110 may include artificial intelligence (AI) and/or machine learning (ML), such as an AI/ML engine 112, to identify attributes such as day-parts, viewer duration, and the like (e.g., avoiding any user-level privacy issues). The attributes may be input to a first layer ML model 114 having a synthetic audience panel 116, a synthetic audience model 118, a deep learning (DL) model 120 to predict audience demographics, and a DL model 122 to predict co-viewership. The system 100 may include simulation enhanced learning environment 124 to generate synthetic audience data using a synthetic audience-based simulation 126, and to use a reinforcement learning-based audience targeting controller (e.g., deep reinforcement learning 128) to dynamically adjust a targeting strategy to achieve a higher OTR.

Still referring to FIG. 1, the system 100 may include ML library 130 (e.g., from the first layer ML model 114) for an audience prediction model 132, a DL model 134 for co-viewership predictions, and advertisement recommendations 136 (e.g., based on audience/OTT campaign information). The system 100 may include an API service 138 (e.g., REST API) having an audience targeting recommendation service 140 as an interface to query and deliver recommendations. The system 100 may include back-testing 142, which may receive actual OTT data 144 (e.g., the next day), and may use a back-testing dashboard 146 to facilitate the back-testing. Feedback 148 from the back-testing 142 may be provided to the simulation enhanced learning environment 124 to allow the simulation enhanced learning environment 124 to adjust a targeting strategy to achieve a higher OTR.

Figure 2:
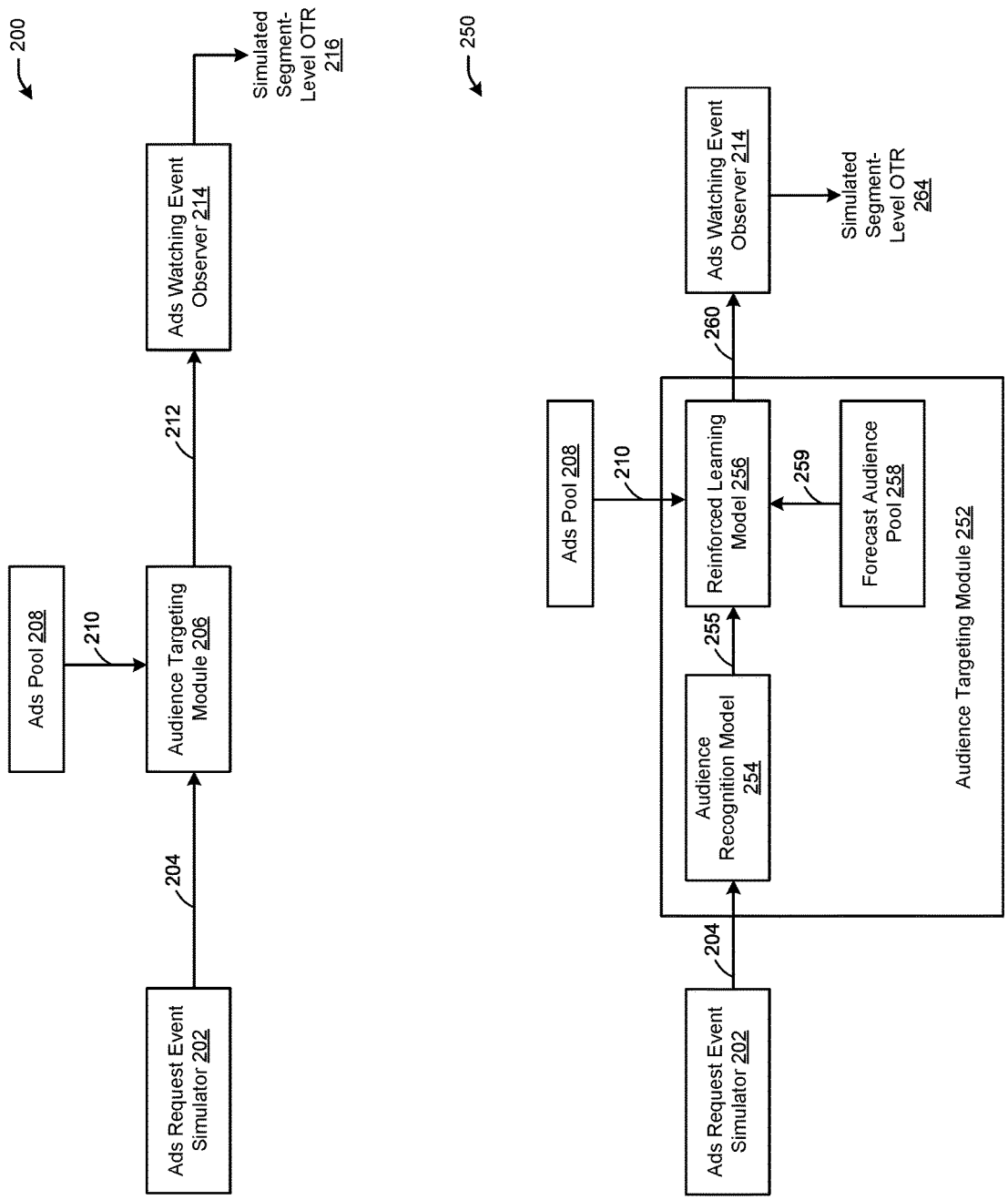
FIG. 2 shows example in-flight advertisement delivery systems, in accordance with one or more example embodiments of the present disclosure.

FIG. 2 shows example in-flight advertisement delivery systems, in accordance with one or more example embodiments of the present disclosure.

Referring to FIG. 2, an in-flight advertisement delivery system 200 may include an advertisement request event simulator 202 with which to provide a bid request 204 to an audience targeting module 206. From an advertisement pool 208, the audience targeting module 206 may receive active campaign information 210 (e.g., total and remaining budgets, target demographics, start and end dates, etc.). The audience targeting module 206 determine the winning demographic segment 212, and an advertisement watching event observer 214 may use the winning demographic segment 212 to generate simulated segment-level OTR data 216 (e.g., indicating the OTR for a given bid request).

Still referring to FIG. 2, an in-flight advertisement delivery system 250 may include an audience targeting module 252 with an audience recognition model 254, a reinforcement learning model 256, and a forecast audience pool 258. The advertisement request event simulator 202 may provide the bid request 204 to the audience targeting module 252, where the audience recognition module 254 may generate estimated audience demographic probabilities 255 (e.g., demographic probability vectors). The reinforcement learning model 265 may receive the estimated audience demographic probabilities 255 and expected future audience statistics 259 generated by the forecast audience pool 258, and may select a winning demographic segment 260 using the reinforcement learning algorithm described herein. The advertisement watching event observer 214 may use the winning demographic segment 260 to generate simulated segment-level OTR data 264 (e.g., indicating the OTR for a given bid request). In this manner, the in-flight advertisement delivery system 250 may represent an enhancement to the in-flight advertisement delivery system 200 by including the audience recognition model 254, the reinforcement learning model 256, and the forecast audience pool 258 as described herein. The audience targeting module 206 and the audience targeting module 252 both may represent enhancements over existing systems at least due to their abilities to identify winning demographic segments.

Figure 3:
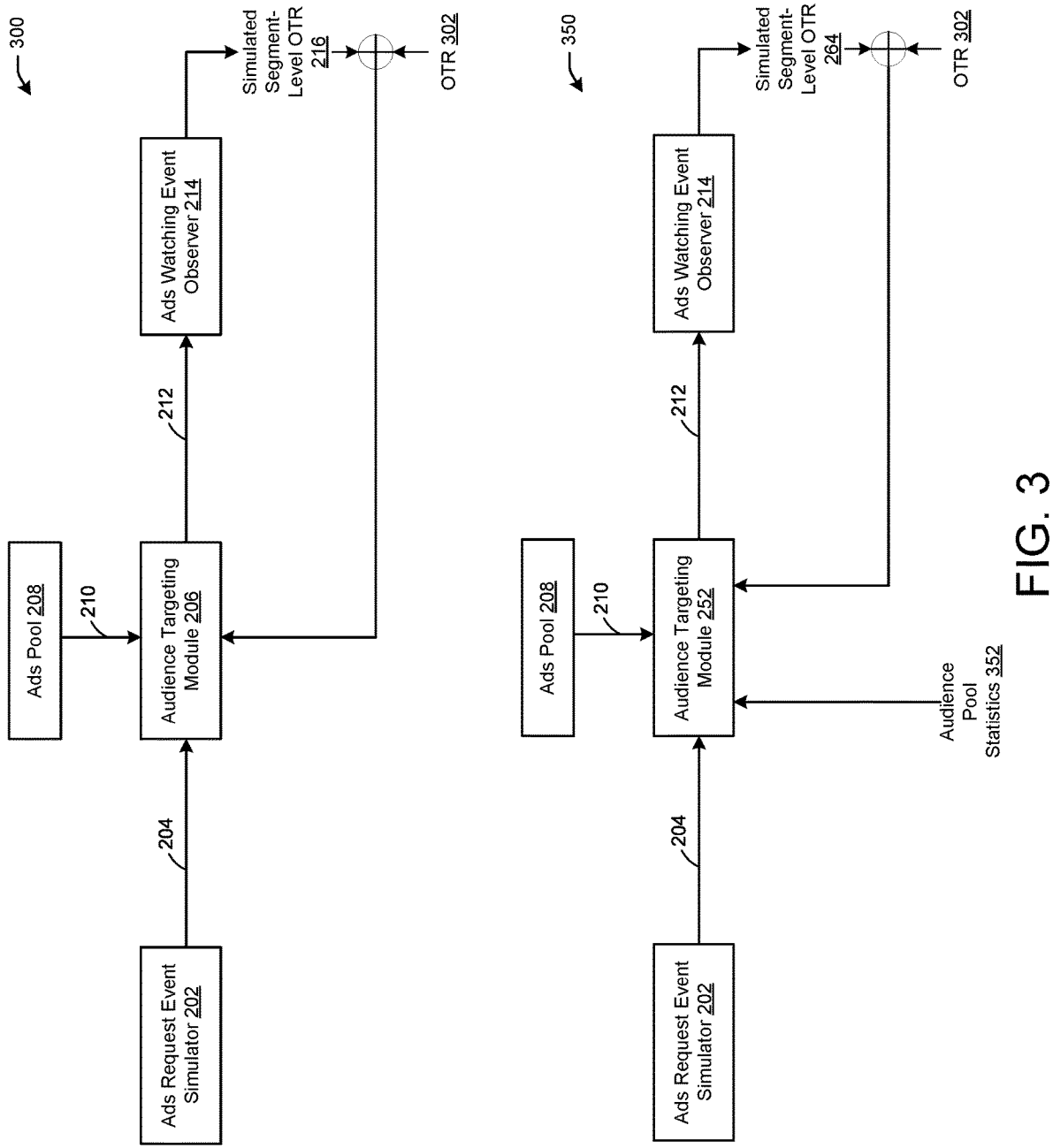
FIG. 3 shows calibrations of the in-flight advertisement delivery systems of FIG. 2, in accordance with one or more example embodiments of the present disclosure.

FIG. 3 shows calibrations of the in-flight advertisement delivery systems of FIG. 2, in accordance with one or more example embodiments of the present disclosure.

Referring to FIG. 3, a calibration 300 of the in-flight advertisement delivery system 200 of FIG. 2 may include an actual OTR 302 being fed into the audience targeting module 206 as feedback. A calibration 350 of the in-flight advertisement delivery system 250 of FIG. 2 may include the actual OTR 302 being fed into the audience targeting module 252 as feedback. The OTR 302 may be from actual campaign data, and may be used to calibrate the hyper-parameters in the simulation of the segment-level OTR. In this manner, the audience targeting module 206 and the audience targeting module 252 may learn from the actual OTR 302, comparing the OTR to the segment-level OTR 216 and 264, respectively, and adjusting hyper-parameters used to generate the segment-level OTR 216 and 264 based on how the segment-level OTR 216 and 264 compare to the actual OTR 302. The audience targeting module 252 also may receive audience pool statistics 352 as feedback (e.g., the actual audience pool), which may be compared to the forecast audience pool 258 of FIG. 2.

Figure 4:
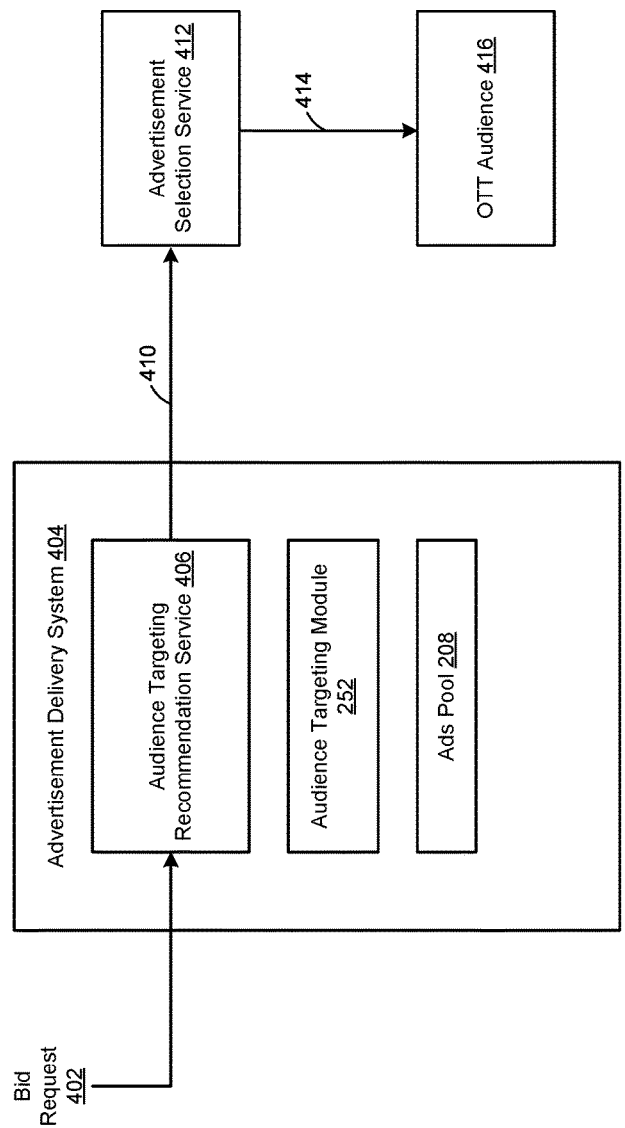
FIG. 4 shows an example audience targeting recommendation system, in accordance with one or more example embodiments of the present disclosure.

FIG. 4 shows an example audience targeting recommendation system 400, in accordance with one or more example embodiments of the present disclosure.

Referring to FIG. 4, the audience targeting recommendation system 400 may receive a bid request 402 at an advertisement delivery system 404 that may include an audience targeting recommendation service 406, the audience targeting module 252 of FIG. 2, and the advertisements pool 208 of FIG. 2. The audience targeting recommendation system 400 may respond to the bid request 402 when the bid request 402 includes a known customer identifier. The audience targeting recommendation service 406 may generate, based on the bid request 402, a ranked list 410 of top demographic segments or campaigns for the bid request 402. The ranked list 410 may be received by an advertisement selection service 412, which may process the ranked list 410 to select the winning campaign's advertisement 414 for the bid request 402. The winning campaign's advertisement 414 may be presented to an OTT audience 416 (e.g., via an OTT video stream).

In one or more embodiments, the advertisement delivery system 404 may pool current campaign information from the advertisement pool 208, including the target demographic segments, total budget, remaining budget, and start and end dates for a campaign. A campaign may be an aggregated campaign of multiple campaigns having a same target demographic segment, so the budgets of the aggregated campaigns also may be aggregated.

Figure 5:
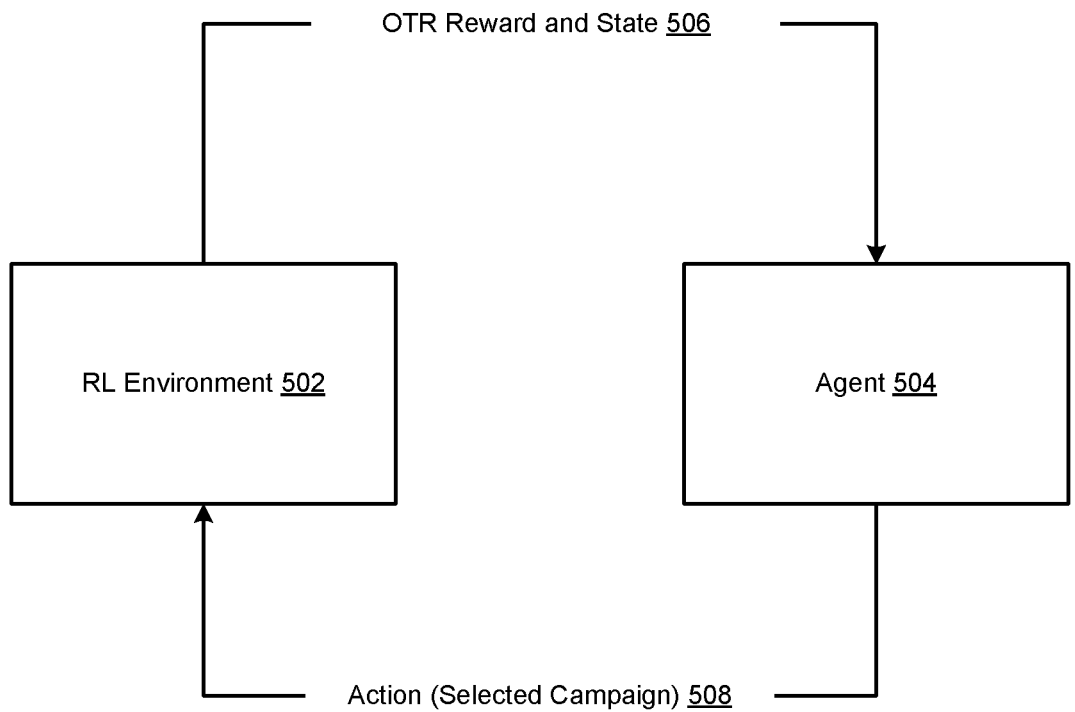
FIG. 5 shows an example reinforcement learning environment and agent of the reinforcement learning model of FIG. 2, in accordance with one or more example embodiments of the present disclosure.

FIG. 5 shows an example RL environment 502 and agent 504 of the reinforcement learning model 256 of FIG. 2, in accordance with one or more example embodiments of the present disclosure.

Referring to FIG. 5, the RL environment 502 may generate an OTR reward and state 506 (e.g., a campaign and a bid request), and the agent 504 may perform an action 508 (e.g., selecting a campaign) based on the OTR reward and state 506.

In one or more embodiments, the RL environment 502 may receive bid requests and advertisement campaigns, along with the estimated audience demographic probabilities 255 generated by the audience recognition model 254 of FIG. 2. A state may refer to the concatenation of three vectors: the matching vector of the estimated demographic representation of the bid request with the campaign demographics, $G\hat{b}_i$, the element-wise product of $G\hat{b}_i$ and $1[r_i>0]$, where $1[r_i>0]$ is a binary vector indicating whether the remaining campaign budget is positive for any respected campaign (e.g., an aggregated campaign for a respective segment), and the normalized campaign remaining budget (e.g., an aggregated campaign for a respective segment)

$$\frac{r_i}{\max_j(r_{i,j})}.$$

Therefore, the dimension of the state may be 3×D (e.g., three times the dimension of the D non-overlapping demographic groups). For an i-th bid request with a $j_i$-th campaign assigned, the RL model may assign an OTR reward of +1 when $\langle b_i, g_{j_i} \rangle >0$ and $r_{i,j_i}>0$, otherwise the reward may be zero. The action taken by the agent 504 may be the selection of a campaign. The RL model may use an agent and policy to decide which campaign is to be selected based on the state. Once a campaign is selected, the RL environment may assign a reward to the agent, which updates the policy according to the reward. The RL model may use a Q-learning algorithm to learn the policy by learning a Q-value function that maps state and action to an expected reward. Given a state, the policy may be based on the maximal Q value over all actions. Because the state is continuous while the action is discrete, the RL model may formulate $Q(s, j)=[f(s)]_j$, where $f:R^{3D} \to R^S$ and s is the state vector, while j is the campaign index. A parametric model, such as a neural network, may model the policy f.

In one or more embodiments the RL model may use RL learning to learn the policy f and use the target policy g to generate next expected values. The RL model algorithm is shown below:

Data: Number of epoch T, bid request generator with their estimated viewer demographic vector $\{\hat{b}_i^{(t)}\}_{i=1,2,\ldots,N}$ for t=1, 2, ..., T, campaign targeting demographic matrix G, campaign budget vector m, target update interval P, reward decay rate γ.

Result: A state value function that provides scores for assigning campaigns a given state.

Initialize the policy $f:\mathbb{R}^{3D} \to \mathbb{R}^S$ to be a parametric model;
Initialize the target g by f;
Initialize memory M;
for t=1, 2, ..., T do
  Restart the bid request generator;
  Remaining budget $r_1^{(t)}$=m;
  for i=1, 2, ..., T do
    Create the state $$u_i^{(t)} = \left[G\hat{b}_i^{(t)}, G\hat{b}_i^{(t)} \odot 1[r_i^{(t)} > 0], \frac{r_i^{(t)}}{\max_j(r_{i,j}^{(t)})}\right];$$

Get action from policy $j_1^{(t)}=\text{argmax}_j f(u_1^{(t)})_j$,
    Update remaining budget $$r_{i+1}^{(t)} = r_i^{(t)} - e_{j_i^{(t)}};$$

Get reward $$w_i^{(t)} = 1\left[b_{i(t)}^T G_{j_i^{(t)},:} > 0\right] \cdot 1\left[r_{i,j_i^{(t)}}^{(t)} > 0\right];$$

if i>1 then
    Append ($u_{i-1}^{(t)}$, $j_{i-1}^{(t)}$, $u_i^{(t)}$, $w_{i-1}^{(t)}$) to memory M;
    Q_learning (f, g, M, γ);
end
if mod (i, P)==0 then
    Sync the parameters of g by those of f;
end
end
end
return f.

Figure 6:
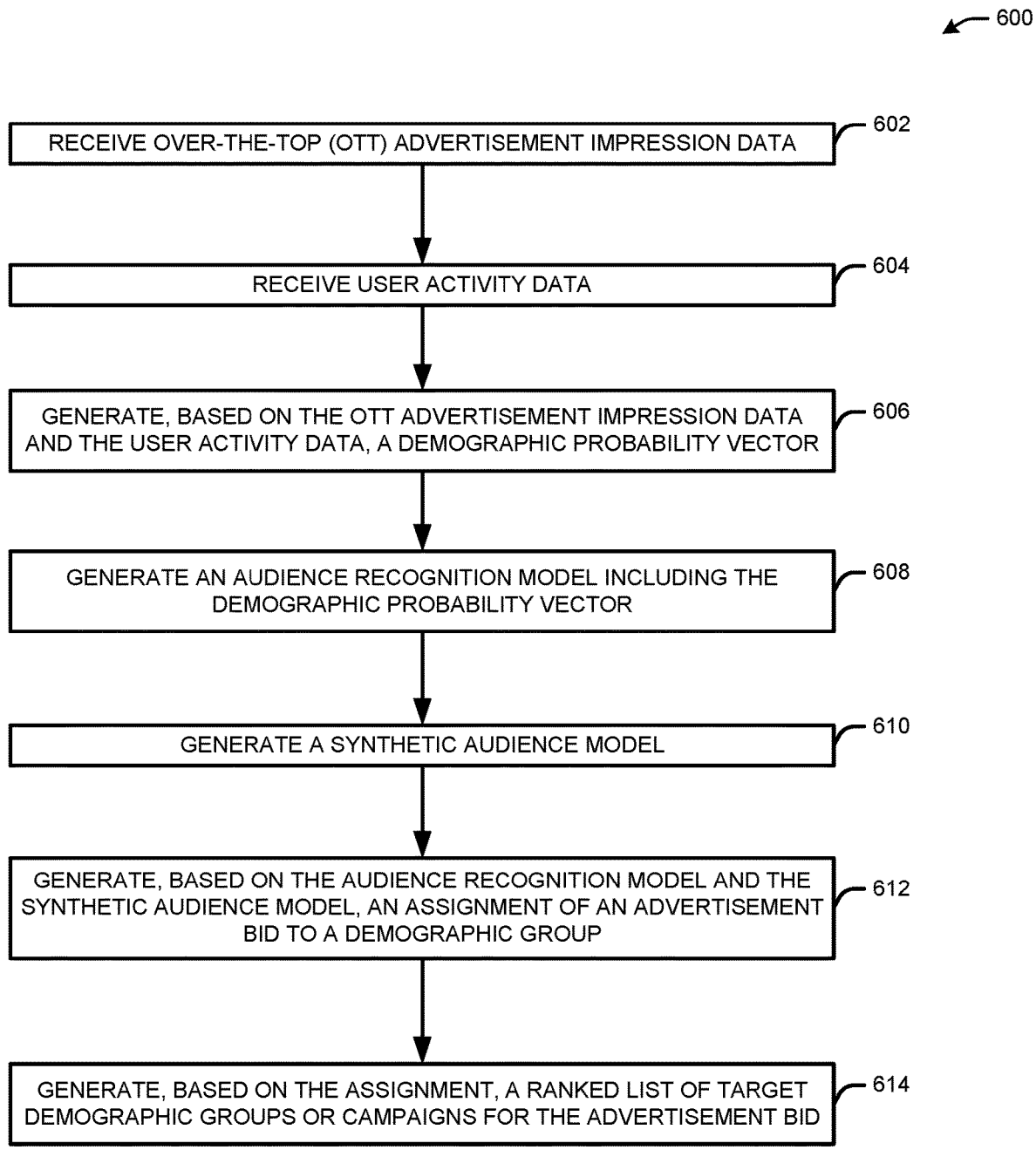
FIG. 6 illustrates a flow diagram for a process for optimizing the on-target rate of video advertisements, in accordance with one or more example embodiments of the present disclosure.

In one or more embodiments, the Q_learning(f, g, M, γ) algorithm above may be defined by:
Data: current policy f, current target g, memory M, decay rate γ;
Sample a set of state $u_0$, action j, next_state $u_1$, and reward w from M;
Calculate current state-action value $v_0 = f(u_0)_j$;
Calculate expected state action value $v = \gamma v_1 + w$;
Update the parameters off according to gradient of $l(v, v_0)$ with respect to the parameters of f;

FIG. 6 illustrates a flow diagram for a process 600 for optimizing the on-target rate of video advertisements, in accordance with one or more example embodiments of the present disclosure.

At block 602, a device (or system, e.g., the system 100 of FIG. 1) may receive OTT advertisement impression data (e.g., the OTT impression data 104 of FIG. 1), including advertisement metadata and bid request content. The bid request content may include household and/or contextual data, excluding age and gender, as those are target labels to be predicted.

At block 604, the device may receive user activity data, such as television survey data or other data (e.g., the audience survey data 102, the first person audience data 106, the user account data 108 of FIG. 1), including web browser or application data (e.g., indicating when a user viewed content using a particular device or application). The device may be affiliated with an OTT streaming service, and may have OTT user data as provided by the OTT users (e.g., account data). However, the device may not provide television (e.g., using cable and/or optical systems), so the television survey data may be provided by a third party. The survey questions may cover television viewing behaviors, but not OTT viewing behavior. In this manner, the model may predict the true demographics of an OTT viewer. The model may assume that an individual's viewing behavior and preferences are similar for OTT and television viewing (e.g., if a viewer watches action movies on television, the viewer watches action movies on OTT). The survey data may not include impression-level data. The system may extract labeled data for training the model. For example, the survey data may indicate whether a person watches television during particular day-parts during the week or weekend, and the genres of programming that the person watches.

At block 606, the device may generate, based on the OTT advertisement impression data, a first demographic probability vector. The device may label any impression with a respective demographic group. The device may determine respective probabilities that the content associated with the impression was presented to respective demographic groups. Contextual and/or household features may be included in bid requests that correspond to the impressions, and the features may lack age and gender data. In this manner, the device may estimate a probability that content was presented (e.g., as indicated by an impression) to a viewer in a particular demographic group based on the contextual and/or household data. For example, when content is of a particular genre, was presented during a particular day-part, using a particular application or device, and/or when the household associated with the account to which the content was presented (e.g., as indicated by an impression) has a particular number of viewers of particular demographics, the device may assign probabilities of the viewer to respective demographic groups. For example, a kids program may be more likely to be viewed by a younger demographic. A law enforcement drama may be more likely to be viewed by an older demographic. Content viewed later at night may be more likely to be viewed by an older demographic. For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model may predict a viewer's demographic probability as $h_i$=[0.05, 0.45, 0.2, 0.3]. The first demographic probability vector may be generated using a first audience recognition model trained using the OTT advertisement impression data. The device may generate, based on the user activity data, a second demographic probability vector. The first and second demographic probability vectors may include numeric entries, each of which indicates the probability of a viewer being in a particular demographic group. For example, demographic probability vector $b_2$=[0.05, 0.45, 0.2, 0.3] indicates a 5% chance that the viewer is in a first demographic group, a 45% chance that the viewer is in a second demographic group, a 20% chance that the viewer is in a third demographic group, and a 30% chance that the viewer is in a fourth demographic group. Different numbers of demographic groups may be applied, and the sum of the entries of a demographic probability vector should add to 1 (e.g., 100%). The user activity data may indicate that a viewer watches a particular genre of content during particular day-parts. Because certain genres of content at certain day-parts are more likely to be viewed by certain demographics, as indicated by the user activity data, the device may assign probabilities that a viewer of any particular content presented at a particular time is part of any demographic group. In this manner, two different demographic probability vectors may be generated—one using OTT data, another using television data. The device may generate a third demographic probability vector based on the first and second demographic probability vectors. The third demographic probability vector may be generated using an additive approach or using a multiplicative approach that combines the two demographic probability vectors (e.g., the OTT vector and the television vector). For example, using two models in the ensemble, an additive approach may be represented by Equation (1): $\hat{b} = \alpha \hat{b}_1 + (1-\alpha)$, where $0 \leq \alpha \leq 1$, and a multiplicative approach may be represented by Equation (2): $\hat{b} = \text{softmax}(\hat{b}_1 \odot \hat{b}_2)$, where $\odot$ represents element-wise multiplication.

At block 608, the device may generate an audience recognition model (e.g., the audience recognition model 254 of FIG. 2) indicative of the third demographic probability vector. Using one of the approaches in block 606, the device may generate a combined (e.g., total) cross-channel estimate represented by the third demographic probability vector b, in which the vector includes respective values each representing a probability that a viewer is in a particular demographic group. For example, when b=[0.1, 0.5, 0.2, 0.2] indicates a 10% chance that the viewer is in a first demographic group, a 50% chance that the viewer is in a second demographic group, a 20% chance that the viewer is in a third demographic group, and a 20% chance that the viewer is in a fourth demographic group.

At block 610, the device may generate a synthetic audience model (e.g., the synthetic audience model 118 of FIG. 1). The synthetic audience model may use missing observations generated based on probabilistic distribution. For example, the advertising system may fit a viewership distribution within a household composition (e.g., number of household members and individual demographic information) using actual advertisement impression data. The active audience panel and additional audience survey data (e.g., of OTT users) may be used to generate the probabilistic distribution of the actual viewers in the household, considering both multi-member households and co-viewership (e.g., multiple household viewers both watching a served advertisement). The synthetic audience generated from the probabilistic distributions (e.g., percentages that a viewer is in respective demographic groups) may replicate the actual household composition, viewing behavior, household member demographics, and the real-time viewers. The synthetic audience model may forecast based on day-parts (e.g., hourly), enabling the implementation of an audience pool to report the real-time number of audiences within respective demographic groups. Blocks 608 and 610 do not need to occur in any particular order, nor do any other blocks unless otherwise stated.

At block 612, the device may generate, based on the audience recognition model and the synthetic audience model, an assignment of an advertisement bid to a demographic group. The previously trained audience recognition model may be input into the simulation model to enable the control policies to be optimized using a RL model to improve the overall OTR. For any bid request in a simulated time window, the audience recognition model may estimate the respective probabilities of the audience's demographic (e.g., a percentage likelihood of being in a first demographic group, a percentage likelihood of being in a second demographic group, and so on for various possible demographic groups). The RL model may assign a bid to a demographic segment (e.g., group) by accounting for the audience demographic probability, expected future bid requests from different demographic groups, and all active campaign impressions to be delivered.

At block 614, the device may generate, based on the assignment of block 612, a ranked list of target demographic groups or campaigns for the advertisement bid. The device may use a RL-based campaign prioritization model to optimize audience targeting based on estimated demographics of an audience, forecasted future OTT traffic, and current active campaigns. The enhanced machine learning framework may be deployed as a real-time audience targeting recognition service, which may output a ranked list of optimal target audience segments for campaigns based on a bid request. A production audience targeting system may consume the ranked list to determine which campaign wins a bid.

Figure 7:
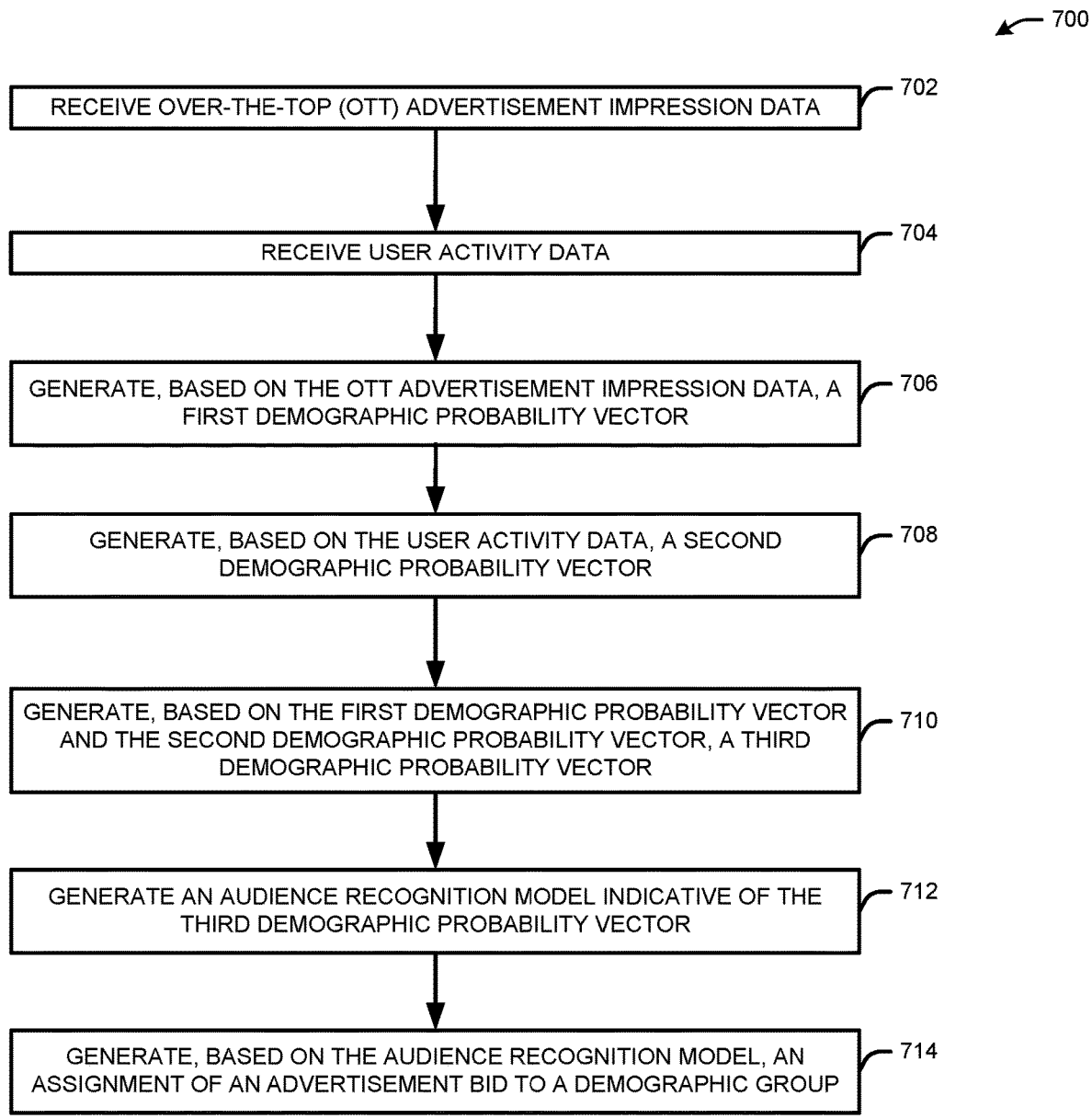
FIG. 7 illustrates a flow diagram for a process for generating an audience recognition model for optimizing the on-target rate of video advertisements, in accordance with one or more example embodiments of the present disclosure.

FIG. 7 illustrates a flow diagram for a process 700 for generating an audience recognition model for optimizing the on-target rate of video advertisements, in accordance with one or more example embodiments of the present disclosure.

At block 702, a device (or system, e.g., the system 100 of FIG. 1) may receive OTT advertisement impression data (e.g., the OTT impression data 104 of FIG. 1), including advertisement metadata and bid request content. The bid request content may include household and/or contextual data, excluding age and gender, as those are target labels to be predicted.

At block 704, the device may receive user activity data, such as television survey data or other data (e.g., the audience survey data 102, the first person audience data 106, the user account data 108 of FIG. 1), including web browser or application data (e.g., indicating when a user viewed content using a particular device or application). The device may be affiliated with an OTT streaming service, and may have OTT user data as provided by the OTT users (e.g., account data). However, the device may not provide television (e.g., using cable and/or optical systems), so the television survey data may be provided by a third party. The survey questions may cover television viewing behaviors, but not OTT viewing behavior. In this manner, the model may predict the true demographics of an OTT viewer. The model may assume that an individual's viewing behavior and preferences are similar for OTT and television viewing (e.g., if a viewer watches action movies on television, the viewer watches action movies on OTT). The survey data may not include impression-level data. The system may extract labeled data for training the model. For example, the survey data may indicate whether a person watches television during particular day-parts during the week or weekend, and the genres of programming that the person watches.

At block 706, the device may generate, based on the OTT advertisement impression data, a first demographic probability vector. The device may label any impression with a respective demographic group. The device may determine respective probabilities that the content associated with the impression was presented to respective demographic groups. Contextual and/or household features may be included in bid requests that correspond to the impressions, and the features may lack age and gender data. In this manner, the device may estimate a probability that content was presented (e.g., as indicated by an impression) to a viewer in a particular demographic group based on the contextual and/or household data. For example, when content is of a particular genre, was presented during a particular day-part, using a particular application or device, and/or when the household associated with the account to which the content was presented (e.g., as indicated by an impression) has a particular number of viewers of particular demographics, the device may assign probabilities of the viewer to respective demographic groups. For example, a kids program may be more likely to be viewed by a younger demographic. A law enforcement drama may be more likely to be viewed by an older demographic. Content viewed later at night may be more likely to be viewed by an older demographic. For example, when there are four demographic groups (e.g., [male: ages 2-18; male: ages 18-34; female: ages 2-18; female: ages 18-34]), the target demographic segment of a campaign targeting adults ages 18-34 may include the demographic groups male: ages 18-34 and female: ages 18-34. The ground truth viewer demographic vector may be represented by b=[0, 1, 0, 1], and the audience recognition model may predict a viewer's demographic probability as $\hat{b}_1$=[0.05, 0.45, 0.2, 0.3]. The first demographic probability vector may be generated using a first audience recognition model trained using the OTT advertisement impression data.

At block 708, the device may generate, based on the user activity data, a second demographic probability vector. The first and second demographic probability vectors may include numeric entries, each of which indicates the probability of a viewer being in a particular demographic group. For example, demographic probability vector $b_2$=[0.05, 0.45, 0.2, 0.3] indicates a 5% chance that the viewer is in a first demographic group, a 45% chance that the viewer is in a second demographic group, a 20% chance that the viewer is in a third demographic group, and a 30% chance that the viewer is in a fourth demographic group. Different numbers of demographic groups may be applied, and the sum of the entries of a demographic probability vector should add to 1 (e.g., 100%). The user activity data may indicate that a viewer watches a particular genre of content during particular day-parts. Because certain genres of content at certain day-parts are more likely to be viewed by certain demographics, as indicated by the user activity data, the device may assign probabilities that a viewer of any particular content presented at a particular time is part of any demographic group. In this manner, two different demographic probability vectors may be generated—one using OTT data, another using television data.

At block 710, the device may generate a third demographic probability vector based on the first and second demographic probability vectors. The third demographic probability vector may be generated using an additive approach or using a multiplicative approach that combines the two demographic probability vectors (e.g., the OTT vector and the television vector). For example, using two models in the ensemble, an additive approach may be represented by Equation (1): $\hat{b}=\alpha\hat{b}_1+(1-\alpha)$, where $0\leq\alpha\leq1$, and a multiplicative approach may be represented by Equation (2): $\hat{b}=\text{softmax}(\hat{b}_1\odot\hat{b}_2)$, where $\odot$ represents element-wise multiplication.

At block 712, the device may generate an audience recognition model (e.g., the audience recognition model 254 of FIG. 2) indicative of the third demographic probability vector. Using one of the approaches in block 712, the device may generate a combined (e.g., total) cross-channel estimate represented by the third demographic probability vector b, in which the vector includes respective values each representing a probability that a viewer is in a particular demographic group. For example, when $\hat{b}$=[0.1, 0.5, 0.2, 0.2] indicates a 10% chance that the viewer is in a first demographic group, a 50% chance that the viewer is in a second demographic group, a 20% chance that the viewer is in a third demographic group, and a 20% chance that the viewer is in a fourth demographic group.

At block 714, the device may generate, based on the audience recognition model, an assignment of an advertisement bid to a demographic group. The previously trained audience recognition model may be input into the simulation model to enable the control policies to be optimized using a RL model to improve the overall OTR. For any bid request in a simulated time window, the audience recognition model may estimate the respective probabilities of the audience's demographic (e.g., a percentage likelihood of being in a first demographic group, a percentage likelihood of being in a second demographic group, and so on for various possible demographic groups). The RL model may assign a bid to a demographic segment (e.g., group) by accounting for the audience demographic probability, expected future bid requests from different demographic groups, and all active campaign impressions to be delivered.

Figure 8:
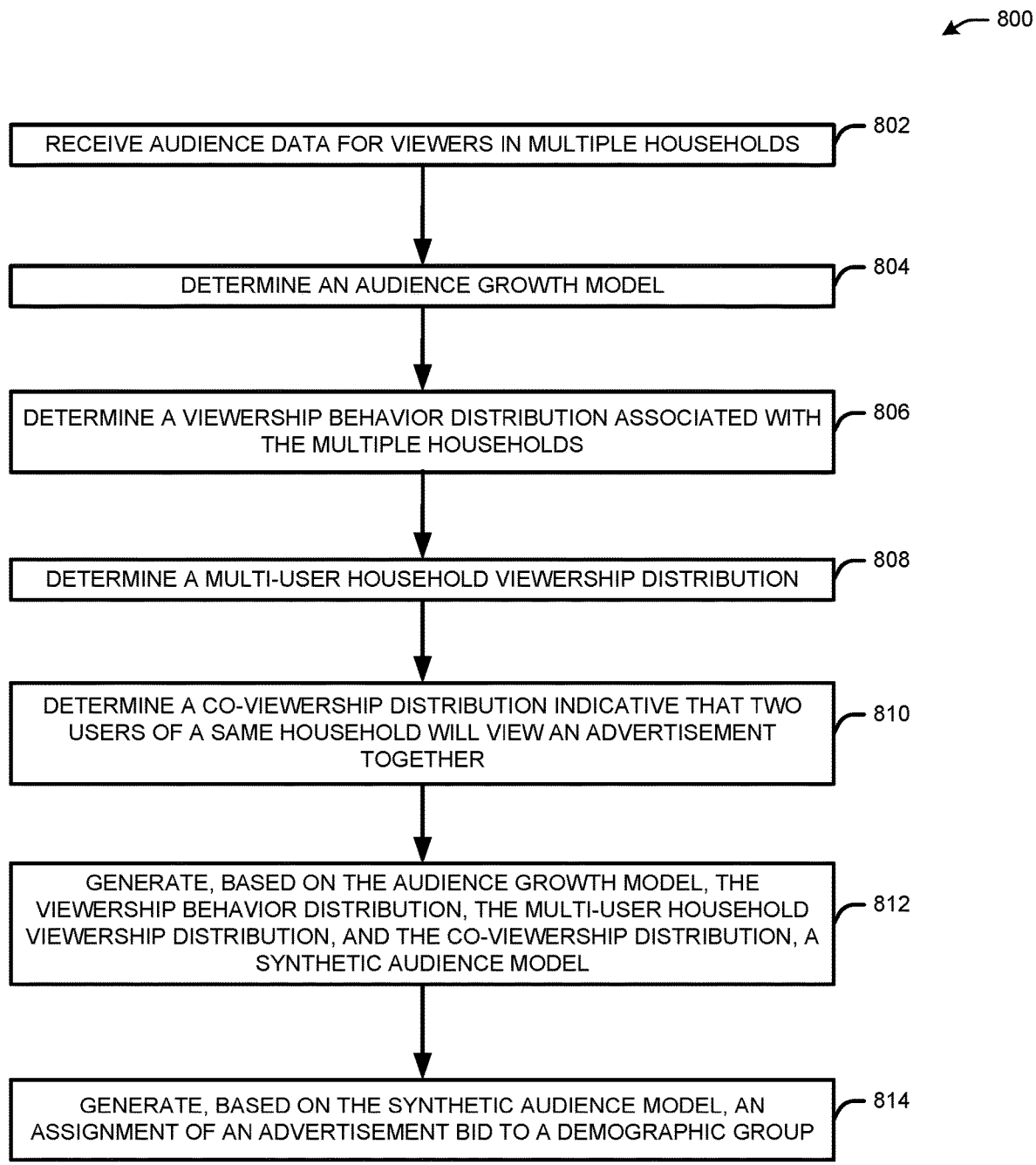
FIG. 8 illustrates a flow diagram for a process for generating a synthetic audience model for optimizing the on-target rate of video advertisements, in accordance with one or more example embodiments of the present disclosure.

FIG. 8 illustrates a flow diagram for a process 800 for generating a synthetic audience model for optimizing the on-target rate of video advertisements, in accordance with one or more example embodiments of the present disclosure.

At block 802, a device (or system, e.g., the system 100 of FIG. 1) may receive audience data from viewers in multiple households. The audience data may refer to actual, first-person data provided by viewers (e.g., users who watch OTT content), survey data, and/or user account data. The audience data may indicate audience growth, demographics, and audience viewership during various day-parts. The device may use the real audience data to replicate OTT impression data.

At block 804, the device may determine an audience growth model, which may indicate hourly audience growth. For example, hourly audience growth may indicate the number or percentage of viewers added during one or more day-parts. During prime time evening hours, for example, audiences may grow at different rates than daytime day-part audiences. The hourly audience growth model may generate independent base forecasts for any video programs, and may use a reconciliation approach to combine the independent forecasts to obtain an estimator for the value P such that $\tilde{c}_{o,h} = SP\hat{c}_{o,h}$ based on the trace of the covariance matrix of the forecast errors. The optimal reconciled forecasts may be generated by the equation: $\tilde{c}_{o,h} = S(S'W_h^{-1}S)^{-1}S'W_h^{-1}\hat{c}_{o,h}$, where $W_h$ is the covariance matrix of the corresponding base forecast errors, and S is the summing matrix. The hourly audience growth model may use an optimal combination using ordinary least squares, an optimal combination using structurally weighted least squares (e.g., scaling the base forecasts using the variance of the residuals—weighted least squares), or a bottom-up method.

At block 806, the device may determine a viewership distribution associated with the multiple households. The viewership behavior distribution may be indicative of first viewership behavior associated with a first household composition and second viewership behavior associated with a second household composition. Household composition may be characterized as single adult households and/or MAU households. Household composition may be based on user account data, first-person data, survey data, or the like, indicating a number of users in a household. H may be the set of all households in the original impression data, and $C_H$ may be the number of households in H. To clarify the usage of household composition, the device may divide OTT users (e.g., users of an OTT media service) into N disjoint demographic groups G, where $g_i \in G$ represents a demographic group (e.g., female: aged 18-34, etc.). The system may define household composition as a N-length vector $m=[m_1, \ldots, m_N]$, where $m_i \in R$ represents the number of household members belonging to a demographic group $g_i$. There are a finite number of unique household compositions, so it may be beneficial to categorize H household composition groups M, where M is the set of all household composition groups, and each $M \in M$ represents a unique household composition group. Day-parts may be represented by D, where $D \in D$ is a specific day-part period. For each M, the device may divide into multiple subgroups, where each subgroup may represent an OTT viewership behavior during a specific day-part. The device may, for simplicity, consider an hourly average watching time during a day-part on OTT as the viewership behavior, represented by $T^D$. The device may characterize households in any subgroup as $H_{M,T^D}$. For example, if $g_1$=F18-34, M=[1, 0, \ldots, 0], D=primetime day-part, then $H_{M,T^D}$ represents the households with a single household member who is female, aged 18-34 whose hourly average OTT viewing time is T during prime time. The $H_{M,T^D}$ values may be disjoint, and $H=\cup H_{M,T^D}$. $C_{M,T^D}$ may represent the number of households in $H_{M,T^D}$.

At block 808, the device may determine a multi-user household viewership distribution indicating probabilities that different viewers in a same household view content. Using H as the set of all household compositions in the MAU households in the panel, and $C_H$ as the households in the MAU whose composition is H, for any H∈H, the system may use h=[$h_1, \ldots, h_N$] to represent each user in the household, and {$g_i, \ldots, g_n$} to represent the corresponding demographic group. Given a specific day-part, the system may determine a probability of viewing during the day-part as {$P_1, \ldots, P_n$}. An input to the algorithm may include demographic groups G, day-part categories D, and OTT panel data. The output may be a household viewership distribution P using the algorithm:
For each H∈H,
Determine the number of households in $C_H$;
For each $$h_i \in H, P_i = \frac{\text{number of impressions exposed to } h_i}{\text{number of impressions exposed to } H};$$

P=P∪{$g_1, \ldots, g_n, P_1, \ldots, P_n$}.

At block 810, the device may determine a co-viewership distribution indicating a probability that multiple viewers of a same household view content. To calibrate viewership distribution for co-viewership distribution, the device may map multiple levels of survey answers (e.g., strongly agree, somewhat agree, somewhat disagree, strongly disagree) to probabilities {$P_1, P_2, P_3, P_4$}. The number of adults in the labeled third-party survey data and the number of people from OTT user survey data as demographic group g may be represented as $M^g$, $A^g$ respectively. $H_i$ may represent the household of respondent i and $H_i^g$ may represent the number of demographic group g adults in $H_i$ as $H_i^g$. Matching with $OTR_g$, the system may estimate {$P_1, P_2, P_3, P_4$} using $$\frac{\Sigma_i 1_{g \in H_i \Sigma_j P_j H_i^g + M^g}}{A^g} = OTR_g. \quad \text{Equation (3)}$$

At block 812, the device may generate a synthetic audience model based on the distributions and models of blocks 804-810. The synthetic audience model may indicate viewing behavior of multiple viewers of multiple households. In this manner, the synthetic audience model learns from the real audience data and the audience behavior across multiple channels to generate a distribution of audience demographics and the viewing behavior of the audience demographics. The synthetic audience model may include multiple parts: the audience growth model, the viewership behavior distribution over different household composition groups, the multi-user household distribution, and the co-viewership distribution. The viewer behavior may indicate which content is viewed at a particular time. Correlating the viewer behavior with the audience demographics may indicate which content is viewed by particular demographics at particular times, allowing for frequency capping and targeted selection of content. The device may replace impression data with the synthetic audience model when the impression data is deleted periodically (e.g., due to a privacy policy). In this manner, the synthetic audience model may replicate the impression data.

At block 814, the device may generate, based on the synthetic audience model, an assignment of an advertisement bid to a demographic group. The previously trained audience recognition model may be input into the simulation model to enable the control policies to be optimized using a RL model to improve the overall OTR. For any bid request in a simulated time window, the audience recognition model may estimate the respective probabilities of the audience's demographic (e.g., a percentage likelihood of being in a first demographic group, a percentage likelihood of being in a second demographic group, and so on for various possible demographic groups). The RL model may assign a bid to a demographic segment (e.g., group) by accounting for the audience demographic probability, expected future bid requests from different demographic groups, and all active campaign impressions to be delivered.

The descriptions herein are not meant to be limiting.

Figure 9:
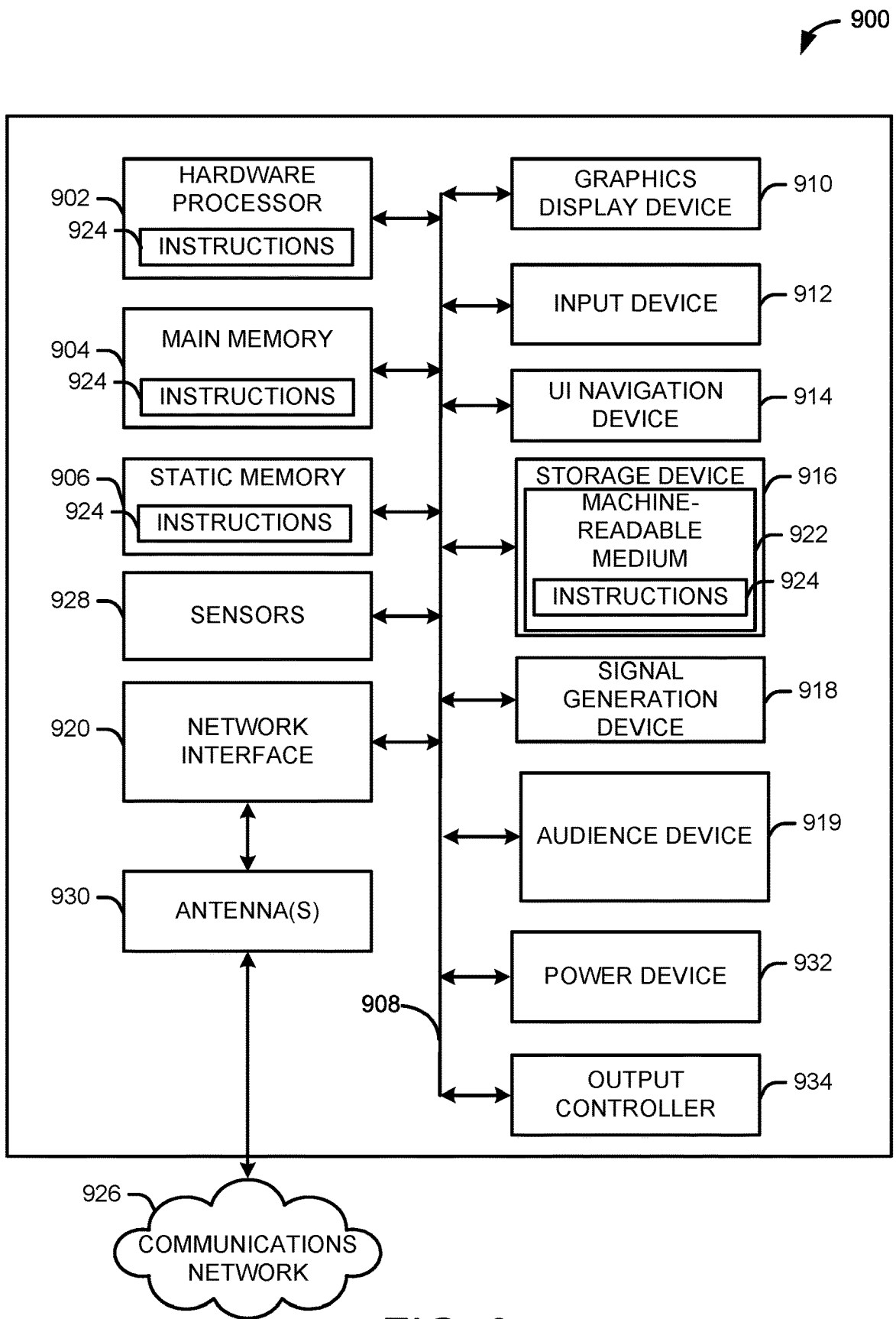
FIG. 9 illustrates a block diagram of an example machine upon which any of one or more techniques (e.g., methods) may be performed, in accordance with one or more example embodiments of the present disclosure.

FIG. 9 illustrates a block diagram of an example of a machine 900 (e.g., system 100 of FIG. 1, the in-flight advertisement delivery system 200 of FIG. 2, the in-flight advertisement delivery system 250 of FIG. 2, the audience targeting recommendation system 400 of FIG. 4) or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in Wi-Fi direct, peer-to-peer (P2P), cellular, (or other distributed) network environments. The machine 900 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, a tensor processing unit (TPU) or another artificial intelligence/machine learning hardware, or any combination thereof), a main memory 904 and a static memory 906, some or all of which may communicate with each other via an interlink (e.g., bus) 908. The machine 900 may further include a power management device 932 (e.g., a battery or other power source), a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918, an audience device 919 (e.g., capable of performing any of the functions described in FIGS. 1-8, including one or more artificial intelligence/machine learning accelerator hardware), a network interface device/transceiver 920 coupled to antenna(s) 930, and one or more sensors 928, such as a microphone, a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for audience targeting across multiple content mediums, the method comprising:
   receiving, by at least one processor of a system, over-the-top (OTT) advertisement impression data comprising metadata and content of advertisement bid requests, the metadata indicative of scheduled OTT media presentation;
   receiving, by the at least one processor, survey data indicative of day-part times when television viewers watch content;
   determining, by the at least one processor, a number of non-overlapping demographic groups comprising age ranges;
   generating, by the at least one processor, based on the OTT advertisement impression data as inputs to a first machine learning model, a first demographic probability vector, wherein each entry of the first demographic probability vector is indicative of a first probability that an OTT viewer is in a respective age range of the non-overlapping demographic groups;
   generating, by the at least one processor, based on the survey data as inputs to the first machine learning model, a second demographic probability vector, wherein each entry of the second demographic probability vector is indicative of a second probability that a television viewer is in a respective age range of the non-overlapping demographic groups;
   generating, by the at least one processor, based on a combination of the first demographic probability vector and the second demographic probability vector, using the first machine learning model, a third demographic probability vector for the OTT advertisement impression data and the survey data, wherein each entry of the third demographic probability vector is indicative of a third probability that a viewer is in a respective age range of the non-overlapping demographic groups and wherein the third probability is a cross-channel probability for both OTT and television;
   generating, by the at least one processor, using the first machine learning model, without deterministic identities of the viewers represented by the third demographic probability vector, an audience recognition model comprising the third demographic probability vector;
   generating, by the at least one processor, based on the OTT advertisement impression data and the survey data as inputs to a second machine learning model, a synthetic audience model predicting future advertisement viewing behavior associated with multiple viewers including the viewer;
   generating, by the at least one processor, based on the audience recognition model and the synthetic audience model as inputs to a third machine learning model, an assignment of an advertisement bid to a respective demographic group of the non-overlapping demographic groups; and
   generating, by the at least one processor, based on the assignment, a ranked list of target demographic groups of the non-overlapping demographic groups for a bid request associated with the advertisement bid.

2. The method of claim 1, further comprising:
receiving audience data associated with a first viewer in a first household and a second viewer in a second household, the multiple viewers comprising the first viewer and the second viewer, the audience data comprising at least one of: advertisement impression data, audience survey data, or user account data, the audience data indicative of at least one of demographic information, an advertisement viewing time, or a type of advertisement viewed;
determining an audience growth model indicative of respective numbers of viewers in respective demographic groups of the non-overlapping demographic groups during a day-part time of the day-part times;
determining a viewership behavior distribution indicative of first viewership behavior associated with a first household composition and second viewership behavior associated with a second household composition, wherein the first household composition and the second household composition are different;
determining a multi-user household viewership distribution indicative of a probability that a third viewer in the first household will view an advertisement instead of the first viewer; and
determining a co-viewership distribution indicative of a probability that the first viewer and the third viewer will view an advertisement,
wherein generating the synthetic audience model is further based on the audience growth model, the viewership behavior distribution, the multi-user household viewership distribution, and the viewership distribution.

3. The method of claim 1, further comprising:
generating, for the bid request, a campaign target demographic matrix for a campaign based on the non-overlapping demographic groups;
determining a number of remaining impressions associated with the bid request;
generating, for the bid request, a state vector based on the campaign target demographic matrix and the number of remaining impressions associated with the bid request;
determining a policy using a Q-learning technique associated with selecting the campaign; and
selecting the campaign based on the policy.

4. A method for audience targeting across multiple content mediums, the method comprising:
receiving, by at least one processor of a system, streaming video advertisement impression data comprising metadata and content of advertisement bid requests, the metadata indicative of scheduled streaming video presentation;
receiving, by the at least one processor, survey data indicative of day-part times when television viewers watch content;
determining, by the at least one processor, a number of non-overlapping demographic groups comprising age ranges;
generating, by the at least one processor, based on the streaming video advertisement impression data and the survey data, using a first machine learning model, a demographic probability vector for the streaming video advertisement impression data and the survey data, wherein each entry of the demographic probability vector is indicative of a probability that a viewer is in a respective age range of the non-overlapping demographic groups, and wherein the probability is a cross-channel probability for both streaming video and television;
generating, by the at least one processor, using the first machine learning model, without deterministic identities of the viewers represented by the demographic probability vector, an audience recognition model comprising the demographic probability vector;
generating, by the at least one processor, based on the streaming video advertisement impression data and the survey data as inputs to a second machine learning model, a synthetic audience model predicting future advertisement viewing behavior associated with multiple viewers including the viewer;
generating, by the at least one processor, based on the audience recognition model and the synthetic audience model as inputs to a third machine learning model, an assignment of an advertisement bid to a respective demographic group of the non-overlapping demographic groups; and
generating, by the at least one processor, based on the assignment, a ranked list of target demographic groups of the non-overlapping demographic groups for a bid request associated with the advertisement bid.

5. The method of claim 4, wherein the demographic probability vector is a first demographic probability vector, the method further comprising:
generating, based on the streaming video advertisement impression data as inputs to a first machine learning model, a second demographic probability vector, wherein each entry of the first demographic probability vector is indicative of a first probability that a streaming video viewer is in a respective age range of the non-overlapping demographic groups; and
generating, based on the survey data as inputs to the first machine learning model, a third demographic probability vector, wherein each entry of the second demographic probability vector is indicative of a second probability that a television viewer is in a respective age range of the non-overlapping demographic groups,
wherein the first demographic probability vector is based on the second demographic probability vector and the third demographic probability vector.

6. The method of claim 4, further comprising:
receiving audience data associated with a first viewer in a first household and a second viewer in a second household, the multiple viewers comprising the first viewer and the second viewer, the audience data comprising at least one of: advertisement impression data, audience survey data, or user account data, the audience data indicative of at least one of demographic information, an advertisement viewing time, or a type of advertisement viewed;
determining an audience growth model indicative of respective numbers of viewers in respective demographic groups of the non-overlapping demographic groups during a day-part time of the day-part times;
determining a viewership behavior distribution indicative of first viewership behavior associated with a first household composition and second viewership behavior associated with a second household composition, wherein the first household composition and the second household composition are different;
determining a multi-user household viewership distribution indicative of a probability that a third viewer in the first household will view an advertisement instead of the first viewer; and determining a co-viewership distribution indicative of a probability that the first viewer and the third viewer will view an advertisement, wherein generating the synthetic audience model is further based on the audience growth model, the viewership behavior distribution, the multi-user household viewership distribution, and the viewership distribution.

7. The method of claim 4, further comprising:

generating, for the bid request, a campaign target demographic matrix for a campaign based on the non-overlapping demographic groups;

determining a number of remaining impressions associated with the bid request;

generating, for the bid request, a state vector based on the campaign target demographic matrix and the number of remaining impressions associated with the bid request, wherein a dimension of the state vector is three times the number of non-overlapping demographic groups;

determining a policy using a deep reinforcement learning technique associated with selecting the campaign; and selecting the campaign based on the policy.

8. The method of claim 4, further comprising:

selecting a campaign for the bid request based on the ranked list.

9. The method of claim 4, further comprising:

generating, based on the assignment, a second ranked list of campaigns for the bid request; and selecting a campaign for the bid request based on the second ranked list.

10. The method of claim 4, further comprising:

receiving feedback data indicative of an on-target rate associated with a target demographic group of the target demographic groups;

receiving feedback data indicative of an audience that viewed an advertisement based on the advertisement bid;

generating, based on the on-target rate, a second audience recognition model; and generating, based on the audience that viewed the advertisement, a second synthetic audience model, wherein the second audience recognition model and the second synthetic audience model are inputs to the third machine learning model.

11. The method of claim 4, further comprising:

identifying a pacing value of an advertisement;

generating, based on the pacing value, a priority of the advertisement; and generating, based on the priority, a list of recommended advertisements associated with the advertisement bid.

12. The method of claim 7, wherein the deep reinforcement learning technique is a Q-learning technique, and wherein the policy is based on a maximum Q-value using the Q-learning technique.

13. The method of claim 7, wherein determining the policy is based on a parametric model.

14. The method of claim 7, wherein the deep reinforcement learning technique is based on a decay rate associated with the number of remaining impressions.

15. The method of claim 14, wherein the deep reinforcement learning technique comprises:

determining a state-action value based on the campaign target demographic matrix and a second number of remaining impressions associated with the bid request, the second number of remaining impressions based on a selection of the campaign;

determining an expected state-action value based on the state-action value and the decay rate; and determining the policy based on the expected state-action value.

16. A system for audience targeting, the system comprising at least one processor coupled to memory, the at least one processor configured to:

receive streaming video advertisement impression data comprising metadata and content of advertisement bid requests, the metadata indicative of scheduled streaming video presentation;

receive survey data indicative of day-part times when television viewers watch content;

determine a number of non-overlapping demographic groups comprising age ranges;

generate, based on the streaming video advertisement impression data and the survey data, using a first machine learning model, a demographic probability vector for the streaming video advertisement impression data and the survey data, wherein each entry of the demographic probability vector is indicative of a probability that a viewer is in a respective age range of the non-overlapping demographic groups, and wherein the probability is a cross-channel probability for both streaming video and television;

generate, using the first machine learning model, without deterministic identities of the viewers represented by the demographic probability vector, an audience recognition model comprising the demographic probability vector;

generate, based on the streaming video advertisement impression data and the survey data as inputs to a second machine learning model, a synthetic audience model predicting future advertisement viewing behavior associated with multiple viewers including the viewer;

generate, based on the audience recognition model and the synthetic audience model as inputs to a third machine learning model, an assignment of an advertisement bid to a respective demographic group of the non-overlapping demographic groups; and generate, based on the assignment, a ranked list of target demographic groups of the non-overlapping demographic groups for a bid request associated with the advertisement bid.

17. The system of claim 16, wherein the demographic probability vector is a first demographic probability vector, and wherein the at least one processor is further configured to:

generate, based on the streaming video advertisement impression data as inputs to a first machine learning model, a second demographic probability vector, wherein each entry of the first demographic probability vector is indicative of a first probability that a streaming video viewer is in a respective age range of the non-overlapping demographic groups; and generate, based on the survey data as inputs to the first machine learning model, a third demographic probability vector, wherein each entry of the second demographic probability vector is indicative of a second probability that a television viewer is in a respective age range of the non-overlapping demographic groups, wherein the first demographic probability vector is based on the second demographic probability vector and the third demographic probability vector.

18. The system of claim 16, wherein the at least one processor is further configured to:
- receive audience data associated with a first viewer in a first household and a second viewer in a second household, the multiple viewers comprising the first viewer and the second viewer, the audience data comprising at least one of: advertisement impression data, audience survey data, or user account data, the audience data indicative of at least one of demographic information, an advertisement viewing time, or a type of advertisement viewed;
- determine an audience growth model indicative of respective numbers of viewers in respective demographic groups of the non-overlapping demographic groups during a day-part time of the day-part times;
- determine a viewership behavior distribution indicative of first viewership behavior associated with a first household composition and second viewership behavior associated with a second household composition, wherein the first household composition and the second household composition are different;
- determine a multi-user household viewership distribution indicative of a probability that a third viewer in the first household will view an advertisement instead of the first viewer; and
- determine a co-viewership distribution indicative of a probability that the first viewer and the third viewer will view an advertisement,
- wherein to generate the synthetic audience model is further based on the audience growth model, the viewership behavior distribution, the multi-user household viewership distribution, and the viewership distribution.

19. The system of claim 16, wherein the at least one processor is further configured to:
- generate, for the bid request, a campaign target demographic matrix for a campaign based on the non-overlapping demographic groups;
- determine a number of remaining impressions associated with the bid request;
- generate, for the bid request, a state vector based on the campaign target demographic matrix and the number of remaining impressions associated with the bid request, wherein a dimension of the state vector is three times the number of non-overlapping demographic groups;
- determine a policy using a deep reinforcement learning technique associated with selecting the campaign; and
- select the campaign based on the policy.

20. The system of claim 19, wherein the deep reinforcement learning technique is based on a decay rate associated with the number of remaining impressions.

* * * * *